United States Patent
Daragon et al.

(10) Patent No.: US 9,894,593 B2
(45) Date of Patent: Feb. 13, 2018

(54) METHOD FOR AFFILIATING A CLUSTER OF ELECTRONIC DEVICES COMMUNICATING VIA A WIRELESS NETWORK, ASSOCIATED ELECTRONIC DEVICE IMPLEMENTING SAID METHOD AND SYSTEM

(71) Applicants: TRAXENS, Marseilles (FR);
INSTITUT NATIONAL DE RECHERCHE EN INFORMATIQUE ET EN AUTOMATIQUE, Rocquencourt (FR)

(72) Inventors: Pascal Daragon, Greasque (FR);
Natale Guzzo, Marseilles (FR);
Arulnambi Nandagoban, Marseilles (FR); Nathalie Mitton, Villeneuve D'Ascq (FR)

(73) Assignees: TRAXENS, Marseille (FR);
INSTITUTE NATIONAL DE RECHERCHE EN INFORMATIQUE ET EN AUTOMATIQUE, Rocquencourt (FR)

( * ) Notice: Subject to any disclaimer, the term of this patent is extended or adjusted under 35 U.S.C. 154(b) by 0 days.

(21) Appl. No.: 15/606,815

(22) Filed: May 26, 2017

(65) Prior Publication Data
US 2017/0273005 A1 Sep. 21, 2017

Related U.S. Application Data

(63) Continuation of application No. PCT/FR2015/053222, filed on Nov. 26, 2015.

(30) Foreign Application Priority Data

Nov. 27, 2014 (FR) ...................................... 14 61609

(51) Int. Cl.
*H04W 40/32* (2009.01)
*H04W 12/06* (2009.01)
(Continued)

(52) U.S. Cl.
CPC ........... *H04W 40/32* (2013.01); *H04L 67/104* (2013.01); *H04W 40/246* (2013.01); *H04W 12/06* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,460,508 B2 * | 12/2008 | Dssouli | ................... | H04L 67/12 370/254 |
| 2005/0175019 A1 * | 8/2005 | Kalavade | ............ | H04L 63/0823 370/400 |

(Continued)

OTHER PUBLICATIONS

International Search Report (PCT/ISA/210) dated Feb. 19, 2016, by the European Patent Office as the International Searching Authority for International Application No. PCT/FR2015/053222.

(Continued)

*Primary Examiner* — Candal Elpenord
(74) *Attorney, Agent, or Firm* — Buchanan Ingersoll & Rooney PC

(57) ABSTRACT

The invention concerns a wireless communication network that is particularly innovative and robust when said the network, comprising a plurality of nodes, has a dynamic topology. A method implemented by a communicating electronic device acting as a free node of said the network can request, on demand, a procedure for affiliation with a second device that is a member of a cluster. Affiliated with the cluster, a device implementing the method can communicate with a third device acting as cluster head in the same way as a member of the cluster. Such an invention makes it possible, (Continued)

Figure 1:
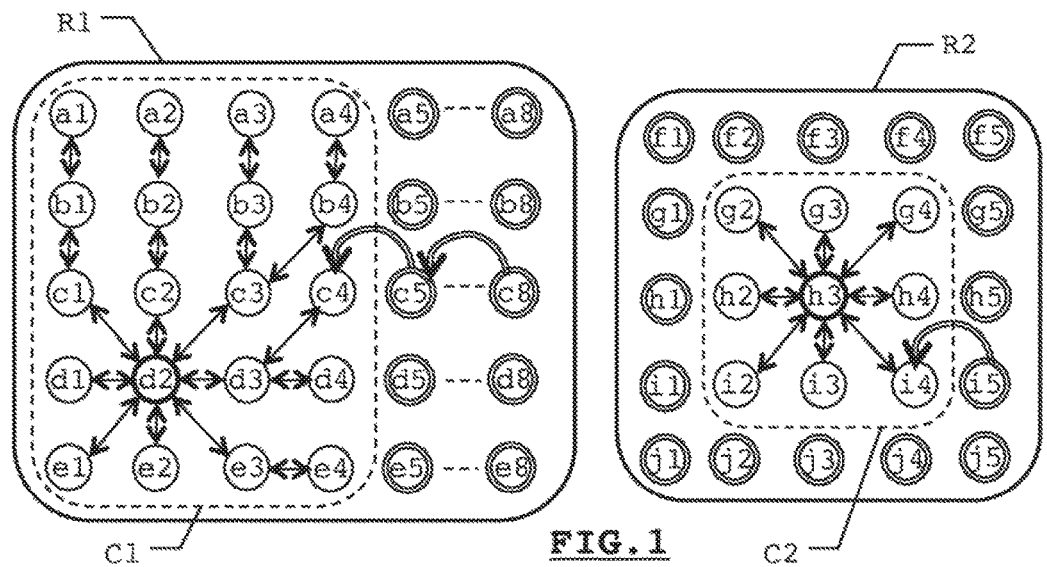

in particular, to operate a traceability system for containers cooperating respectively with such devices on a storage area or a transport platform.

13 Claims, 2 Drawing Sheets

(51) Int. Cl.
*H04W 40/24* (2009.01)
*H04L 29/08* (2006.01)
*H04W 84/18* (2009.01)

(56) References Cited

U.S. PATENT DOCUMENTS

| | | | |
|---|---|---|---|
| 2006/0215673 A1* | 9/2006 | Olvera-Hernandez | H04L 45/46 370/406 |
| 2006/0235972 A1* | 10/2006 | Asnis | H04L 29/12066 709/225 |
| 2007/0291772 A1* | 12/2007 | Andersson | H04L 41/0893 370/400 |
| 2010/0115009 A1* | 5/2010 | Callahan | G06F 17/30067 707/825 |
| 2010/0169446 A1* | 7/2010 | Linden | G06F 11/181 709/206 |
| 2012/0297487 A1* | 11/2012 | Xia | G06F 21/10 726/24 |
| 2014/0219209 A1* | 8/2014 | Soneda | H04W 40/30 370/329 |
| 2014/0301245 A1* | 10/2014 | Rose | H04L 41/0823 370/255 |

OTHER PUBLICATIONS

Written Opinion (PCT/ISA/237) dated Feb. 19, 2016, by the European Patent Office as the International Searching Authority for International Application No. PCT/FR2015/053222.

Heinzelman et al., "An Application-Specific Protocol Architecture for Wireless Microsensor Networks", IEEE Transactions on Wireless Communications, Oct. 2002, pp. 660-670, vol. 1, No. 4.

Guzzo et al., "A Cluster-based and On-demand routing algorithm for Large-Scale Multi-hop Wireless Sensor Networks", Sep. 2014, pp. 1-12, XP055213614.

Tantisiriroj et al., "The Cluster Protocol", Jan. 2008, pp. 1-23, XP055213609.

Heinzelman et al., "Energy-efficient communication protocol for wireless microsensor networks", Proceedings of the 33rd Annual Hawaii International Conference on System Sciences, Jan. 2000, pp. 1-10, XP055158497.

* cited by examiner

METHOD FOR AFFILIATING A CLUSTER OF ELECTRONIC DEVICES COMMUNICATING VIA A WIRELESS NETWORK, ASSOCIATED ELECTRONIC DEVICE IMPLEMENTING SAID METHOD AND SYSTEM

The invention relates to a method for affiliating a cluster of communicating electronic devices, said method being implemented by a processing unit of one of said electronic devices communicating with peers through a wireless communication network.

The invention further relates to a system including a plurality of devices implementing such an affiliation method.

As a non-limiting example preferred application, the invention is described through an example application relative to the collection of properties, for example a temperature, moisture level, brightness, vibration frequency, shocks, etc., related to the internal and/or external environments of containers of goods or merchandise, or more generally, containers. According to the example application, said containers are grouped together and/or stacked in a storage area or traveling on a transport platform such as a container ship, a freight train or any other appropriate transportation platform. Each container cooperates with one of said communicating devices. The latter are responsible for collecting and conveying said properties through service messages to peer devices acting as "cluster heads" or "heads." One of the missions of a head consists of carrying out a predetermined service. Such a service may for example consist of aggregating data collected by the communicating devices and sending said data, after it has been aggregated, to a remote entity, through a long-range or long-distance connection of the satellite connection or radio telephony connection type. The invention cannot, however, be limited solely to this example application. More generally, a "head" device is responsible for carrying out a given service related to data collected and conveyed by its peers, said given service being able to relate to supervision or alarm management, in place of or in addition to communication with a remote entity.

Numerous typologies or configurations of networks of communicating objects exist today. FIG. 1 schematically shows two examples of wireless communication networks R1 and R2. Irrespective of the operated network, each communicating device, which will also generally be called "node" within such a network, implements a communication method allowing it to exchange data messages and/or service messages with a third-party or peer node. Thus, the network R1 situates forty communicating electronic devices respectively referenced a1 to a8, b1 to b8, c1 to c8, d1 to d8 and e1 to e8 in FIG. 1. The network R2 in turn situates twenty-five communicating devices, respectively referenced f1 to f5, g1 to g5, h1 to h5, i1 to i5 and j1 to j5 in FIG. 1.

Whether one operates a single-hop network, such as the network R2 described in connection with FIG. 1, or a multi-hop network, such as the network R1 described in connection with FIG. 1, a first node that we will call "source" node can prepare a service message, represented in FIG. 1 by a double arrow with a single line, including data related, as a non-limiting example, to a property measured by a sensor cooperating with said first node, intended for a second so-called "recipient" node.

According to a single-hop network, the communication between the first and second nodes is direct. Conversely, according to a multi-hop network, such a communication may be indirect. Thus, a message sent from a source node can be relayed by one or several "relay or intermediary" nodes, whose respective roles consist of resending said message from the source node so that it is in fine conveyed to and received by the receiving node. The source nodes, which are able to communicate directly or indirectly with a head node, constitute "clusters," for example like the clusters C1 and C2 shown by a circle in dotted lines in FIG. 1. The path followed by a service message originating from a first source node and intended for a second receiving node via one or several relay nodes is generally called "route." Thus, according to FIG. 1, a message sent from the node a4 to the node d2 will successively be relayed by the relay nodes b4 and c3.

The communication within single-hop or multi-hop communication networks is generally done by radio. Such communication is generally short-range, i.e., several meters to several tens of meters, such that, the service messages are transmitted from one to another between the different nodes. When data is supposed to be conveyed to a server, or more generally a remote entity, a second communication mode is implemented, for example, by GSM (Global System for Mobile Communication) or GPRS (General Packet Radio Service), or by satellite connection.

The exchanges between nodes, processing operations or calculations carried out by the latter based on exchanged data, as well as the potential and remote conveyance of data collected within a network or cluster of communicating devices, are all actions that consume electricity.

Figure 2:
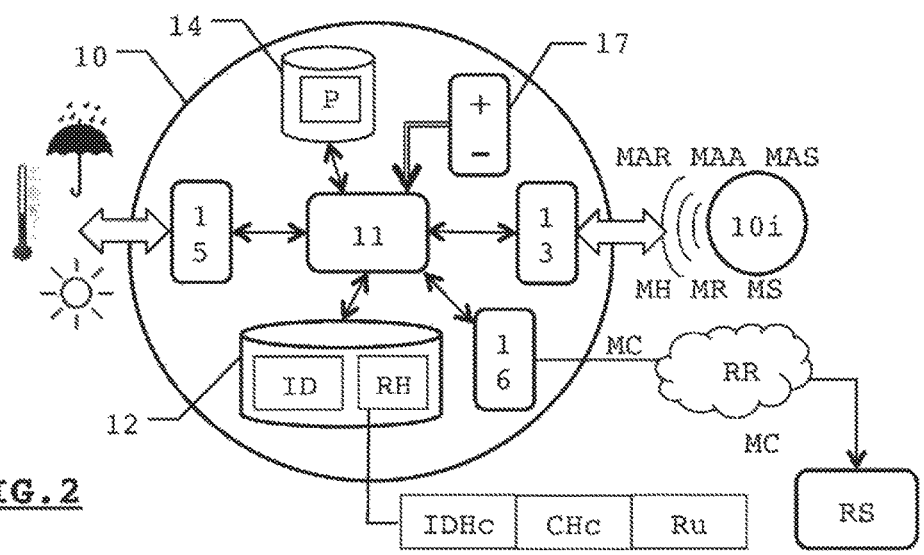

As indicated as a preferred example by FIG. 2, a node generally and primarily consists of an electronic device 10 including a processing unit 11, for example in the form of a microcontroller, cooperating with a data memory 12, optionally a program memory 14, said memories optionally being able to be separated. The processing unit 11 cooperates with said memories 12 and 14 using internal communication buses. An electronic device 10 generally includes one or several measuring sensors 15 for measuring a physical property related to the environment of the device 10. Such a sensor can measure the surrounding temperature, a moisture level or the presence and/or absence of light. The device 10 further includes first communication means 13 cooperating with the processing unit 11 and providing wireless nearby communication with any other electronic device 10i situated within communication range. It may also include second communication means 16 of the "long-distance" type also cooperating with the processing unit 11. These second communication means allow such a device 10 the ability to send a remote entity, for example a server RS, data through messages MC distributed by a network RR for example using the GSM, GPRS or satellite technologies. To operate, i.e., in order for the processing unit 11 to carry out a method derived from the interpretation or performance, by said processing unit, of program instructions P saved in the program memory 14, the device 10 includes an electricity source 17, in the form of one or several batteries, for example. A node's capacity to communicate, or quite simply to be able to operate, is directly related to the remaining and available energy capacity of said node.

Some operators have tried to design networks or communication methods, implemented by nodes within a network or a cluster, to globally preserve the electricity capacity of the network or the cluster. Globally, a first approach consists of distributing the energy cost resulting from exchanges between the nodes over all of said nodes of the network or the cluster. A second approach consists of distributing the energy consumption resulting from the processing operations implemented on collected data, for example a long-distance transmission, over most of the nodes, thus pooling the electricity consumption over a plurality of nodes. Thus, whether the contactless communication network is in the single-hop or multi-hop configuration, a node may arbitrarily be designated or promoted as "head," or at the very least as cluster head, or head node. In connection with FIG. 1, a device acting as head is shown by a circle drawn in thick lines. This is node d2 for network R1 and node h3 for network R2. The nodes d2 and h3 thus act as heads of the clusters C1 and C2, respectively. In this way, the consumed energy, in particular for the remote transmission of data collected within a network, is pooled over a plurality of nodes. Alternatively, the heads can be designated randomly, or more specifically can designate themselves as heads randomly, as long as the latter have sufficient hardware and/or software resources to carry out a predetermined service.

As an example, the "LEACH" method, as in particular described by the document titled "An Application-Specific Protocol Architecture for Wireless Microsensor Networks" (W. Heinzelman, A. Chandrakasan, H. Balakrishnan—IEEE TRANSACTIONS ON WIRELESS COMMUNICATIONS, VOL. 1, NO. 4, OCTOBER 2002), makes it possible, in a single-hop network, to randomly designate a node for it to become head. The other nodes belonging to the cluster of said head, nodes that we will respectively call "member," send the cluster head, therefore the head, their service messages. In connection with FIG. 1, each member node is shown by a circle drawn in thin lines. Thus, within the network R2, the head h3 communicates directly with the nodes g2 to g4, h2 and h3 as well as with the nodes i2 to i4. The head collects said data sent from different member nodes, processes it, aggregates it or consolidates it, and for example initiates a long-range transmission to a remote entity, such as a server RS described in connection with FIG. 2. According to the known technique, once a node has acted as head, such a node cannot assume this role again before a predetermined length of time has passed. A new member node is then randomly designated head, thus ensuring a continuity of service. In order for a node, which we will call "loose," represented by a circle shown in double lines in connection with FIG. 1, to be able to "join" a head and thus form a cluster or join an existing cluster, such a loose node, situated within radio range of a promoted node or node designated as head, is arranged to receive an enrollment message MH coming from said head, generally issued in the form of an undifferentiated transmission (also called "broadcast") of enrollment messages MH intended for any node situated within radio range of the head. FIG. 1 makes it possible, through the network R2, to describe the resultant of a transmission of a message MH sent from the node h3, designated to act as head, this message MH being sent according to a short-range broadcast mode to the nodes situated within communication range, in the case at hand, the nodes g2 to g4, h2 and h4, as well as the nodes i2 to i4, initially loose nodes, like the other nodes, such as, non-exhaustively, the nodes f1 to f5, shown by circles in double lines in FIG. 1. Upon receiving such an enrollment message MH, a loose node, for example the node h4, updates its data memory, said memory cooperating with the processing unit to record the coordinates or the value of the identifier of the head therein, or the identifier of the node h3 in connection with FIG. 1. The device h4, previously loose, becomes a member of the cluster C2, shown by a circle and then lines. The device h3, acting as head, becomes the recipient of any service message MS including data collected by the device h4 newly having become a member of the cluster C2 like the other member devices of said cluster, i.e., the nodes g2, g3, g4, i2, i3 and i4. Thus, said nodes g2 to g4, h2 and h4, like the nodes i2 to i4, previously loose nodes, become member nodes, appearing in circles shown in a single line in FIG. 1. The transmission of the message MH by the node h3 has a limited range. Consequently, nodes situated outside the range do not receive the message MH as an intelligible message, or do not receive it all. The network R2 being of the single-hop type, the nodes that are outside the range of h3, such as the nodes f1 to f5, g1, g5, h1, h5, i1, i5 or the nodes j1 to j5, remain loose nodes, shown by circles drawn in double lines. The cluster C2 only includes the node h3, acting as head, and the member nodes, i.e., having accepted the enrollment of the head h3.

Transposing the LEACH teaching to the context of a multi-hop network, like the network R1 described in connection with FIG. 1, could lead one to believe that the nodes, becoming members of a cluster including a node acting as head, record, within their respective data memories, the route, i.e., the value of the identifier of the node acting as head and at least the value of the identifier of the node having relayed the enrollment message of said head, or alternatively, the respective values of the identifiers of the intermediate or relay nodes separating it from said head. Thus, as an example, the node c2 saves the value of the identifier of the head d2, having directly received an enrollment message MH from said node d2. The node b2 in turn also records the value of the identifier of the node d2, the value of that of the node c2 having relayed the enrollment message MH of d2 in favor of the node b2.

In theory, or at least according to a perfect application mode, such an approach makes it possible to preserve the overall energy resources of a communication network including a plurality of communicating nodes. In practice or in reality, and in particular according to application or operating domains of such a communication network in connection with the transport of containers cooperating with communicating electronic devices, such a solution remains irrelevant, or at least ineffective.

Indeed, let us consider the example of the preferred, but non-limiting example consisting of the use of a wireless communication network whose nodes record, collect and send measurements related to a plurality of containers, such as containers of goods or merchandise. Imagine that each container is associated with a communicating electronic device implementing a communication method such as LEACH or an equivalent of the multi-hop type. According to this hypothesis, each communicating electronic device associated with a container acts as node within the wireless network, like the network R2 described in connection with FIG. 1. Let us imagine that the communication mode between nodes is done by radio channel. Aside from the fact that a communication method of the LEACH type requires a single-hop approach, thus requiring each node to be able to communicate directly with a head, the relative arrangement of the containers, for example on a ship, in a storage area or on any road or rail transport platform, creates an application context, such that a node designated as head may not or may no longer be able to perform its mission, for example consisting of sending aggregated data to a remote unit, due solely to its positioning in a stack of containers, for instance. Indeed, there are many obstacles formed by a transport platform and/or a storage area, due to the partitioning or partial confinement imposed by the structure receiving the containers, or by the interactions mutually created by the containers themselves, the stacking of which may cause a deterioration, or even loss of the ability for a head to perform a long-range transmission. The risk of data loss, slow data conveyance, as well as needless and irrelevant energy expenses to "animate" a cluster whose head would not be able to effectively perform its role or service, is high. This risk is even higher in the case where random elections of consecutive heads results in fruitless "choices." To resolve such drawbacks, the company TRAXENS, associated with the Institut National français de Recherche en Informatique et en Automatique, has designed a wireless communication network that is particularly innovative and high-performing, irrespective of the relative arrangement of the nodes and irrespective of the application or operating framework of said network, whether it is of the single-hop or multi-hop type. Such a network makes it possible to optimize the overall capacity of the network to perform a predetermined service from data collected by the different nodes. It is preferably based on a method of joining a cluster of communicating devices according to head election terms, if and only if the latter are truly able to assume their role as head, for example to send data according to a long-distance communication mode. Each node implementing such a method may decide to act as head, once said node knows that it is in a situation to perform its role effectively. Furthermore, any free node may decide whether to join a cluster of nodes, said cluster including said head, advantageously self-designated.

Such an innovation provides many advantages, which include making it possible to:
  relevantly pool the energy expenses on the nodes of the network, thereby extending the capacity of said network to perform a service in an unparalleled manner relative to the aforementioned solutions;
  design a network of nodes that is automatically adaptable and functional as desired when changes in relative positions occur between the nodes or changes occur in the operating conditions of said nodes, for example during the handling, storage or transport of containers each associated with an electronic device;
  favor the robustness of the service, for example the transmission of data over a long-distance channel, by giving each node the opportunity to determine its role within the network and refer, at each moment, to the best head according to the considered service, while minimizing cluster conflicts or modifications during concomitant elections of a plurality of heads situated within radio range of shared nodes.

Although it proposes a significant advance, such a solution, like the aforementioned concurrent solutions, has certain limitations or drawbacks, in particular if such a communication network is used in an application context for which the topology of said network is particularly prone to change, i.e., for which new nodes wish to join the network or for which nodes move with respect to one another, thus becoming within radio range or, on the contrary, becoming outside radio communication range of a head or a member of a cluster which they had respectively and previously joined.

Indeed, irrespective of the selected communication network, the routes or topologies, i.e., the formation or destruction of clusters, of said network are not updated regularly enough or often enough to account for the dynamics of said network. Using known solutions, if such updates were done at a high frequency, the number of enrollment, cluster destruction or service messages would increase tenfold, such that the main objective of preserving energy consumption of the nodes of the network would not be met.

The invention makes it possible to resolve the large majority of the drawbacks raised by the known solutions. By forming a wireless communication network that is particularly innovative and robust, including when nodes making up said network are movable relative to one another or when the topology of said network proves to be fluctuating, any loose node, i.e., not a cluster head or not a member of a cluster, may request, on demand, an affiliation procedure with a member of the cluster. Such an affiliation procedure may result from an adaptation of the different networks previously described, in particular those illustrated in connection with FIG. 1 or 2. The affiliation requests of loose nodes are shown by arrows with double lines. In the case at hand, these involve nodes c5 or i5, which are respectively requesting an affiliation with nodes c4 and i4, respectively members of clusters C1 and C2, the heads of which are the nodes d2 for the network R1 and h3 for the network R2. FIG. 1 also illustrates alternative according to the invention in which a loose node, like the node c8, can in turn send an affiliation request with a node, in the case at hand the node c5 according to FIG. 1, previously affiliated with the cluster C1 whose cluster head is the node d2.

Each node implementing a method according to the invention can thus, at its request and independently of the enrollment policy of the heads, request an affiliation with a member of the cluster, and thus send service messages to a head, in particular via the member node having accepted the affiliation procedure, even though said head is outside radio range of said node requesting affiliation to send an enrollment message. The invention thus makes it possible to extend clusters formed after an enrollment procedure, or to transform a single-hop network into a "pseudo-multi-hop network," the member node having accepted an affiliation request working as a relay node for the affiliated node to send service messages.

To that end, the invention relates to a method implemented by a processing unit of a first communicating electronic device further including a data memory, first communication means providing nearby wireless communication with any other communicating electronic device situated within communication range within a cluster comprising a plurality of communicating electronic devices, said memory and said communication means cooperating with said processing unit, the data memory storing the value of an identifier dedicated to the first communicating electronic device and a register arranged to include the current value of an identifier of a communicating electronic device acting as a cluster head. Said method includes a step for sending a service message to the device acting as cluster head.

To ensure the persistence of the cluster and prevent the risk of losing information contained in service messages, the method includes:
  a step prior to the sending of the service message for generating and sending, via the first communication means, a verification message for belonging to the cluster, said message encoding:
  i. the value of the identifier of a second communicating electronic device as identifier of the communicating electronic device recipient of said verification message for belonging to the cluster;
  ii the value of the identifier of the first device as identifier of the communicating electronic device that is the source of said verification message for belonging to said cluster.

To limit the flows of messages, the method may provide that the step prior to sending the service message for generating and sending, via the first communication means, a message verifying belonging to the cluster is only carried out if a test step shows that the device is affiliated with the cluster.

To attest to the persistence of the cluster, the method may include:
- a step, carried out if and only if a message acknowledging receipt of said message verifying belonging to the cluster is received before the expiration of a maximum waiting time determined from the sending of the message verifying belonging to the cluster, to decode said message acknowledging receipt and deduce therefrom:
  i. the value of the identifier of the device recipient of said message acknowledging receipt of the message verifying belonging to the cluster;
  ii the value of the identifier of the source device of said message acknowledging receipt of the message verifying belonging to the cluster.

According to this advantageous embodiment, the steps for generating and initiating the sending of a service message are advantageously only carried out if:
- the deduced value of the identifier of the device recipient of the message acknowledging receipt of the message verifying belonging to the cluster is equal to that of the identifier of the first communicating electronic device;
- the value deduced from the identifier of the source device of said message acknowledging receipt of the message verifying belonging to the cluster is equal to that of the identifier of the second communicating electronic device.

To extend said cluster, an affiliation method according to the invention may include:
- a step for receiving a message requesting affiliation generated and sent by a third communicating electronic device requesting an affiliation with a cluster, said affiliation request message including the value of the identifier of said third device requesting an affiliation;
- a step for decoding said affiliation request message and deducing the value therefrom of said identifier of said third device requesting affiliation;
- a step for generating a message acknowledging receipt of the affiliation request consisting of encoding, within said message:
  i. the value of the identifier of the first device as identifier of the source device of said message acknowledging receipt of the affiliation request,
  ii the value of the identifier of the third device requesting affiliation as identifier of the device recipient of said message acknowledging receipt of the affiliation request,
  iii. the current value of the identifier of a fourth communicating electronic device acting as a cluster head, said value being read in the register,
- a step for triggering the sending, by the first communication means, of the message acknowledging receipt of the affiliation request.

If it is possible to quantify a capacity to perform a determined service by an electronic device, the step for generating a message acknowledging receipt of the affiliation request can further consist of encoding a value describing a capacity of the fourth communicating electronic device acting as cluster head to perform a service, said value being saved in the register further storing the current value of the identifier of said fourth communicating electronic device acting as cluster head.

In order for the first communicating electronic device to be able to give favorable and relevant follow-up to an affiliation request, the invention may provide that the step for triggering the sending, by the first communication means, of a message acknowledging receipt of the affiliation request can only be performed if the data memory stores a register including a current value of an identifier of a communicating electronic device acting as cluster head.

The invention may also provide that the first communicating electronic device can in turn be able to request affiliation with a cluster. Such a situation can for example result from a dissolution of the cluster to which said first device belonged. To that end, an affiliation method according to the invention may include:
- a step for generating an affiliation request message consisting of encoding the value of the identifier of the first device as identifier of a device requesting affiliation with a cluster;
- a step for initiating the sending, by the first communication means, of said affiliation request message;
- a step for receiving, by the communication means, a message generated and sent by a fifth device acknowledging receipt of the affiliation request message;
- a step, carried out if and only if said message, acknowledging receipt of the affiliation request message, is received before the expiration of a maximum waiting time determined from the sending of said affiliation request message, to decode said message acknowledging receipt of the affiliation request message and to deduce therefrom:
  i. the value of the identifier of the device recipient of said message acknowledging receipt of an affiliation request;
  ii. the value of the identifier of a sixth communicating electronic device acting as cluster head to which the fifth source device of said message acknowledging receipt of an affiliation request belongs;
- a step, carried out if and only if said deduced value of the identifier of the receiving device is equal to that of the value of the identifier of the first device requesting affiliation, to record, in the register, the deduced value of the identifier of the sixth communicating electronic device acting as cluster head, as current value of the identifier of the device acting as cluster head.

Advantageously, according to this embodiment:
- the step for decoding the message acknowledging receipt of the affiliation request message can further consist of deducing, from said message, the value of the identifier of the fifth communicating electronic device that is the source of said message;
- the step for updating the register may further consist of recording said deduced identifier value therein as identifier of the communicating electronic device and an uplink route separating the first communicating electronic device requesting affiliation from the sixth communicating electronic device acting as cluster head.

To convey information, for example related to the environment of first communicating electronic device, intended for a device acting as cluster head, a method according to the invention may include a step prior to the step for sending a service message intended for device acting as cluster head to generate and initiate, via the first communication means, the sending of the service message intended for the communicating electronic device whose identifier value is stored, as current identifier value of the communicating electronic device acting as cluster head, by the register.

According to a second object, in particular to adapt a communicating electronic device, the invention also relates to a computer program including a plurality of program instructions, which, when they are:

stored beforehand in a program memory of such an electronic device further including a processing unit, first communication means ensuring wireless nearby communication with any other electronic device situated within the communication range, a data memory saving the value of an identifier dedicated to the device and a register to include the current value of an identifier of a device acting as cluster head, said memories and said first communication means cooperating with said processing unit;

executed or interpreted by said processing unit, causes the implementation of an affiliation method as set out by the invention.

According to a third object, the invention further relates to an electronic device including a processing unit, a data memory, a program memory, first communication means providing wireless nearby communication with any other electronic device situated within the communication range, said memories and said first communication means cooperating with said processing unit, the data memory including the value of an identifier dedicated to the device and a register to store the current value of an identifier of a device acting as cluster head. In order for said device to be able to carry out an affiliation method according to the invention, it advantageously includes, in the program memory, the instructions of the program as previously described.

The invention also provides a system including a plurality of such communicating electronic devices. According to one preferred and non-limiting application example, such a system may advantageously include a plurality of containers of goods, solid, fluid or liquid merchandise, said containers respectively cooperating with the communicating electronic devices, the latter each including a sensor cooperating with the processing unit to measure and collect a property related to the internal and/or external environment of said containers.

Figure 3:
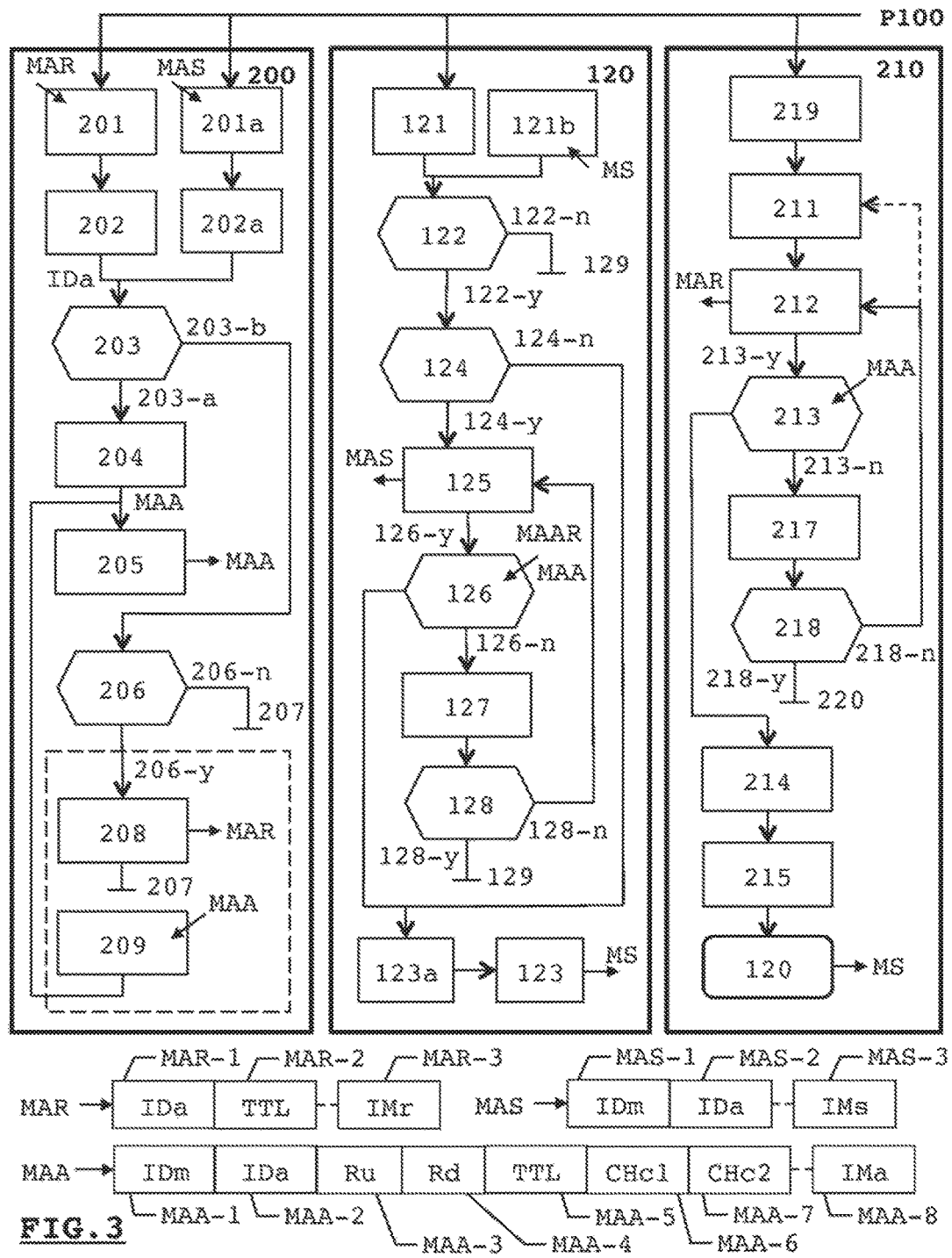

Other features and advantages will appear more clearly upon reading the following description relative to one example embodiment provided for information and non-limitingly and upon examining the figures that accompany it, in which:

FIG. 1, already described, illustrates two example configurations of a wireless communication network, single-hop or multi-hop, respectively;

FIG. 2, already partially described, shows the functional architecture of a communicating electronic device according to the prior art and according to the invention when the latter is suitable for implementing a method for affiliation with a cluster of devices communicating with peers via a wireless communication network, said method being according to the invention;

FIG. 3 shows a functional description of an affiliation method according to the invention.

A communicating electronic device according to the invention is comparable to a known device 10, like that previously described in connection with FIG. 2.

To that end, a communicating electronic device according to the invention includes a processing unit 11, consisting of one or several microcontrollers responsible for carrying out processing operations on data in particular. The data are advantageously saved, in whole or in part, in one or several data memories 12, generally electrically erasable and writable. The memory 12 can advantageously include a non-erasable section, physically isolated or simply arranged so that write access or erasure access is prohibited, or requires satisfying the authentication procedure. Such an advantageous section of the memory 12, modification access to which is restricted, makes it possible in particular to record the value of an identifier ID therein that is dedicated to the communicating electronic device. Advantageously, but not necessarily, a device 10 may further include one or several program memories 14 to save one or several programs P, or more generally one or several sets of program instructions, said program instructions being intelligible by the processing unit 11. The execution or interpretation of said instructions by said processing unit causes the implementation of a data processing or operation method of the device 10. The latter also includes first communication means 13 providing a wireless nearby communication with any other electronic device, such as the device 10i, as long as the latter is within communication range. Via said first communication means 13, the device 10, or more specifically its processing unit 11, can send and/or receive messages to or from third-party devices positioned within communication range. Such messages can be of any kind. The different types of messages include, but are not limited to, data messages MS related to a particular service S, enrollment messages MH, cluster destruction messages MR.

Certain communicating devices can take advantage of the electromagnetic fields created by the network, to draw sufficient electricity therefrom to perform their operation, if only during a short period of time. However, to ensure continuous operation and/or implement processing operations requiring more energy, a communicating electronic device 10 according to the invention can advantageously include its own electricity source 17, in particular powering the processing unit 11, or any other element making up said device that would require it. Such a source 17 generally consists of a battery or a plurality of batteries. Depending on the application context favored in particular in connection with monitoring of the containers, although this particular context cannot limit the exploitation scope of the invention, a communicating electronic device 10 can include one or several sensors 15 cooperating with the processing unit 11. Such a sensor can measure one or several properties related to the internal and/or external environment of said containers and produce data therefrom. As an example, as illustrated by FIG. 2, a sensor 15 can measure the temperature and/or humidity prevailing within a container, the darkness or loss of darkness within the chamber attesting to the untimely opening of the container, or impacts. If necessary, the sensor(s) can cooperate with the processing unit of the device via probes or conducting flat ribbon cables, in particular in the case where a device 10 is affixed against the outer wall of a container where one wishes to use said device 10 to monitor the environment inside said container. Such a device 10 can further include a clock making it possible to timestamp the collected measurements, said clock not being shown in FIG. 2.

According to the service(s) that one wishes to perform using communicating electronic devices according to the invention, the latter can include additional and optional means. As one preferred example, a service may consist of:

collecting data from nodes of a network of communicating electronic devices according to the invention, for example related to properties measured by said nodes;

aggregating said data collected from a plurality of nodes, then generating messages MC encoding consolidated service data intended for a remote entity, such as a server RS.

In order to send such messages MC, a device 10 advantageously includes second long-distance communication means 16 cooperating with the processing unit 11. Such a communication can be done via a network RR, by GPRS or satellite channels, or by any other appropriate communication channel. The different internal components of the electronic device cooperate with the processing unit 11, advantageously by wired buses or by couplings. The device 10 can include a case housing said components, said case advantageously including fastening means to affix the device 10 on a support that one wishes to monitor, in the case at hand a container according to the preferred example application.

To carry out the invention, it is necessary to act on the operation of the processing unit, more specifically on the communication method implemented by said processing unit. Such methods will be described in connection with FIG. 3 later. One preferred adaptation mode consists of providing a program, or more generally mutually arranged program instructions, to carry out said method during the performance or interpretation of said program instructions by the processing unit. Advantageously, said program P is loaded in the program memory 14 during the assembly of said device, or by downloading said program within the memory 14 after said assembly phase of the device.

The invention lies primarily in the implementation of a single-hop network, for example a LEACH network, or advantageously multi-hop, for which each node consists of a communicating electronic device like the device 10 previously described.

A node of such a network is generally adapted or arranged to carry out a method for joining a cluster of devices. The data memory 12 includes, aside from the value of the identifier ID dedicated to the communicating electronic device, a register RH provided to store the current value IDHc of an identifier of a communicating electronic device acting as head, such as the nodes d2 or h3 according to FIG. 1.

When the device chooses to join a cluster whereof at least one of the nodes acts as head, this joining is generally exclusive. In other words, a node cannot be a member of different clusters, i.e., respectively having separate head nodes, for a same service. A node joining a cluster chooses the best head for said service.

However, a node can also be attached to a plurality of heads, if said heads are assigned to implementing separate services, such as, for example, a head for sending long-distance data (service Si) and a second head for implementing an alarm management service (service Sj) on a site.

To that end, like the LEACH solution previously described, clusters of communicating electronic devices, like the clusters C1 and C2 of the networks R1 and R2 described in connection with FIG. 1, include a device acting as head, such as the nodes d2 or h3 described in connection with FIG. 1. The other devices act as members of said cluster, such as, non-exhaustively, the nodes c2 or i3 described in connection with FIG. 1. The role of a member primarily consists of collecting information, for example measurements of environmental properties, translating them into data, and including said data in the form of a service message MS intended for a head capable of performing the determined service. This head recognizes said service messages MS, then carries out the determined service S. For example, such a service may consist of aggregating the data sent to the head from several members via messages MS, then implementing a long-distance transmission of said aggregated data, or even consolidated data, in the form of messages MC intended for a remote entity RS.

A service message MS, sent from a member of a cluster to a head, is structured so as to include:
information characterizing the type of the message (MS, MH, MR, etc.);
the value of an identifier of the source node, also generally a member node;
the value of an identifier of the recipient node, in the case at hand a head, or even an identifier of an intermediate or relay node in the case of a multi-hop network,
data, for example related to properties measured by a sensor of the device,
optionally, a redundancy code, or even a cryptogram or any other piece of control information allowing a node receiving such a service message to decode it, exploit it or relay it.

A message MS, like any other message circulating within the network, can initiate acknowledgment of receipt messages MACK, sent by the recipient of the message to the source node. Upon expiration of a determined period, or "timeout," if no message MACK is received, a new sending of the message MS is initiated, for a limited number of iterations at the end of which the source node considers that the "route" or the communication with the receiving node is not or is no longer available. Such a source node can decide to abandon the cluster and return to a loose node status, or seek to join another cluster.

The joining of a loose node to a node acting as head is close to that implemented according to the LEACH solution. However, the terms for electing a head and the terms of joining by a loose node to become a member of a cluster can be very different, as for example set out by the company TRAXENS, associated with the Institut National français de Recherche en Informatique et en Automatique (INRIA). According to this alternative, only nodes actually able to perform a determined service are able to designate themselves as head. The other nodes are free to arbitrate a competition between heads and choose the head that appears to be the best candidate to carry out the service to which they contribute.

Irrespective of the mode for electing heads, a first design mode of communicating devices consists of keeping the latter continually listening to radio communication frequencies to test the presence of messages coming from peer devices. Such an approach can cause significant energy expenditures and compromise the autonomy of the entire network. The second approach, known as Wake On Radio (WOR), consists of placing the nodes in relative sleep during the large majority of the time of the respective operations. The radio communication is in particular deactivated, because it consumes large amounts of electricity. Such nodes cannot, however, continue carrying out internal processing operations that do not consume much energy. Cyclically, such nodes wake up to listen to any messages coming from peers or to send enrollment, service, etc. messages in turn.

FIG. 3 illustrates a communication method P100 including a procedure for requesting affiliation with a cluster carried out by a first device according to the invention, for example a device 10 described in connection with FIG. 2. Such an on demand affiliation procedure allows a loose node, for example the node c5 or the node i5, to take the initiative of a discovery phase for a member or head node in its vicinity. Such a situation for example results from the appearance of such a loose node whereas the cluster has already been formed. It may also result from the destruction of a cluster whose head node and member nodes become loose after said member nodes need to send service messages to a new head. The situation may also result from excessive separation, or non-optimal positioning, between a capable node that is a candidate for becoming a member and the head, said candidate node being outside radio range or too far in terms of number of hops for the message coming from said head to be conveyed to it.

According to the known techniques, it is necessary for a node to take the initiative to elect itself or to be designated head, and for it to initiate an enrollment procedure, for which the loose nodes can recover member node status. Precious time and energy can thus be lost in conveying service messages.

The invention thus allows a loose node to request attachment to a cluster, therefore directly to a head, through an on-demand affiliation procedure.

We will first describe a processing operation 210 carried out by a communicating electronic device 10 according to the invention, implementing a method P100. Such processing consists of initiating an affiliation procedure.

The latter may advantageously include a prior step 219 for waking up the device 10 if the latter uses a Wake On Radio (WOR) technique, for example. Said processing operation 210 includes a step 211 for generating an affiliation request message MAR. Such a message includes and/or encodes, as first information MAR-1, the value of the identifier IDa of the device 10. Said identifier is advantageously stored uniquely in the storage means 12 of said device 10. The processing operation 210 further includes a step 212 for initiating the transmission of said affiliation request message MAR to any adjacent node, via the first communication means 13. Such a message MAR may encode other additional information IMr in the form of an additional field MAR-3.

The transmission power of such a message MAR may be predetermined and fixed. Alternatively, said transmission power may be variable so as for example to be reduced based on the remaining energy capacity of the internal power supply means 17 of the device carrying out said method P100. Said transmission power may also be gradual, the transmission step 212 being iterative if the affiliation request remains without response, as we will see later.

In all cases, the step 212 for triggering the transmission of an affiliation request message MAR is followed by a step 213 for waiting to receive a message MAA, acknowledging receipt of said affiliation request message MAR, transmitted by an adjacent node that is a member or head of a cluster. A maximum waiting duration in step 213 for such a message MAA can be configured or determined such that at the end of a given length of time, the device 10 implementing said method P100 considers (situation symbolized by the link referenced 213-n in FIG. 3) that it is too isolated or poorly positioned to join a cluster. The processing operation 210 is thus interrupted in step 220. Such a step 220 can further consist of putting the device in sleep or standby mode during a determined period of time using a WOR technique, for example.

When, during step 213, a message acknowledging receipt MAA is received by the means 13 (situation symbolized by the link referenced 213-y in FIG. 3), the processing operation 210 includes a step 214 for decoding said message MAA. Indeed, the invention provides that such a message MAA in particular includes or encodes a first piece of information MAA-1 consisting of the value of the identifier IDm of the device that is the source of said message MAA. The latter further encodes the value of the identifier IDa of the device that is the source of the affiliation request message, as identifier of the recipient device of the message MAA, in the form of a piece of information referenced MAA-2 in the non-limiting example described in connection with FIG. 3. Said message MAA can further advantageously encode the uplink route Ru, in the form of a piece of information referenced MAA-3 in FIG. 3, including the values of the identifiers of the member nodes and/or nodes relaying enrollment messages MH and/or service messages MS between the source node of said message MAA and the head of the cluster to which it belongs. Such a field MAA-3 advantageously includes at least the value of the identifier of the relay node belonging to said route that is closest to the source device of the message MAA and the identifier IDH of the head. A field MAA-4 can further, or alternatively, encode the downlink route separating the source node of the message MAA from the node requesting the affiliation. Advantageously, a message MAA can further include, alternatively or additionally to the fields MAA-3 and/or MAA-4, information MAA-5 reflecting the number of hops TTL necessary for the uplink route Ru or the downlink route Rd. A message MAA can advantageously include or encode fields MAA-6, MAA-7, for example related to values of current capacities CHc1, CHc2 of the head to perform a given service, or any other additional information IMa, in the form of a field referenced MAA-8 in connection with FIG. 3.

Step 214 thus consists of deducing, from the message MAA, all of the relevant information encoded in said message. When step 214 confirms that the identifier value encoded in the field MAA-2 corresponds to the value of the identifier IDa of the device making the affiliation request, the message MAA is considered to be a message acknowledging receipt of said affiliation request. The processing operation 210 then includes a step 215, following step 214, consisting of storing, within storage means 12 of the device, information deduced from said message MAA, in particular the value of the identifier IDH of the head node, or that of the identifier of the first node on the uplink route Ru from the node requesting the affiliation. Such an action can advantageously consist of updating a register Rh, within said storage means 12. The value of the identifier IDH is in particular recorded as current value IDHc within the register Rh. The device 10 then becomes an "affiliated" node with the cluster of the head node. The method P100 can then include and initiate the implementation of a processing operation 120 consisting of sending a service message MS to the head, in particular via the node having responded favorably to the affiliation request, i.e., via the source device of the message MAA.

We have previously seen that the invention provides that the transmission power of an affiliation request message MAR can be progressive. The objective sought by this embodiment is to preserve the energy resources of the means 17 of a device 10 according to the invention. To implement such a progressive approach, the transmission power of a message MAR is first configured by the processing unit to send said message MAR using a short range broadcast-type technique. A first iteration of step 212 thus consists of configuring the transmission power to a floor value Pmin. At the end of the maximum waiting duration set out in step 213, if no message MAA acknowledging receipt of the affiliation request has been received (situation symbolized by the link referenced 213-n in FIG. 3), step 220 is not automatically implemented as for the previous embodiment. Instead, the processing operation 210 consists of initiating a new iteration of step 212, and thus once again transmitting the message MAR with an increased transmission power Pmin+. This increase is done by the processing unit carrying out the processing operation 210 in a step 217, for example according to a given multiplication factor or a determined incremental pitch applied to the floor power Pmin. If, at the end of the maximum duration set out in step 213, no message MAA is received (situation symbolized by the link referenced 213-$n$ in FIG. 3), the processing operation 210 can trigger a new iteration of step 212. One or several iterations of steps 217 and 212 can thus follow one another as long as no message MAA is received while the power Pmin+ remains below a maximum transmission power Pmax of a message MAR (situation symbolized by the link referenced 218-$n$ in FIG. 3). Said iterations cease once, in 218, the maximum transmission power of a message MAR is reached. In this case, the processing operation 210 is interrupted at 220.

The invention provides an alternative or addition to the embodiment previously described in connection with a progressive transmission power of a message MAR. According to this new embodiment, step 211 consisting of generating a message MAR consists of incorporating, into said message, a field MAR-2 specifying the authorized number of hops, which we will denote TTL hereinafter, separating a node requesting an affiliation from a member node or head of a cluster. When said number of hops is greater than one, the invention provides that an affiliation request message MAR can be relayed by a node that is not acting as a member or head of a cluster. We will see later how such a function is made possible by describing a processing operation 200 of the method P100 according to the invention, this processing operation being triggered upon receiving an affiliation request message MAR.

According to this embodiment, steps 211 and 212, for generating and triggering the transmission of a message MAR, respectively, followed by step 213 for waiting to receive a message MAA, are jointly iterated by incrementing or multiplying said authorized number of hops in step 217, at the end of each fruitless iteration, i.e., as long as no message MAA is received in step 213 (situation symbolized by the link referenced 213-$n$ in FIG. 3). When said number of hops TTL reaches a predetermined ceiling, situation symbolized by the link referenced 218-$y$ in FIG. 3, and step 213 has not made it possible to receive a message, the processing operation 210 triggers step 220 and is interrupted. The device carrying out the method P100 remains a loose node. As a non-limiting example, the minimum value of TTL in the first iteration of step 211 can be equal to one, meaning that no relay of the message MAR is authorized by the requester of an affiliation. Upon each iteration, this number can be multiplied by a given multiplying factor, for example with a value equal to two, until said value of TTL reaches a ceiling value equal to 16. Alternatively, the value of TTL can be incremented upon each iteration by one pitch, for example equal to one or any other non-zero integer. The invention further provides that the maximum waiting duration set out in step 213 can also be gradual and revised upon each iteration of step 217.

We will now study several embodiments of a processing operation 200 implemented by the processing unit 11 of a device according to the invention, such as the device 10 described in connection with FIG. 2. Such a processing operation 200 is described in connection with FIG. 3. It is triggered, upon the implementation of an affiliation method P100, in reaction to the receipt of an affiliation request message MAR sent by a third-party device requesting an affiliation with a cluster.

Such a processing operation 200 according to the invention thus includes a first step 201 for receiving an affiliation request message MAR generated and sent by a communicating electronic device, like the node c5 or the node i5, described in connection with FIG. 2. Such a message MAR in particular includes or encodes the value of the identifier IDa of the device requesting an affiliation with a cluster, for example within a field MAR-1. The method P100 also includes a step 202 for decoding said affiliation request message MAR and thus in particular deducing the value of the identifier IDa therefrom.

The invention primarily provides for two situations, respectively symbolized by the links referenced 203-$a$ and 203-$b$ in FIG. 3, when a device according to the invention receives, in 201, an affiliation request message MAR sent by a second device according to the invention and requesting an affiliation with a cluster:
 the device receiving said message MAR is a member node or head of a cluster; such a device, for example the node i4, as described in connection with FIGS. 1 and 2, receiving a message MAR sent from the node i5, includes a register RH encoding a current value IDHc of an identifier IDH, in the case at hand, the identifier of the node h4 acting as the head node of the cluster C2;
 the device receiving said message MAR is a loose node; such a device, for example the node c5, as described in connection with FIGS. 1 and 2, receiving a message MAR sent by the node c8, does not include a register RH encoding a current value IDHc equal to that of an identifier IDH of a node, such as d2, acting as head node; alternatively, such a loose node can include a register RH encoding a determined value indicating that the node is not a member or head of a cluster.

In the first situation (link 203-$a$ in FIG. 3), the processing operation 200 includes a step 204 for generating a message MAA acknowledging receipt of the affiliation request from the device requesting an affiliation. Such a step 204 consists of encoding, within the message MAA (field MAA-2 according to the example of FIG. 3), the value of the identifier IDa of the device that is at the origin of the affiliation request as identifier of the device recipient of the message MAA. As previously mentioned, such a step 204 further consists of encoding (field MAA-1 according to the example of FIG. 3) the value of the identifier IDm of the device carrying out the processing operation 200 and acting as member or head node of a cluster. The step 204 can further encode (field MAA-3 according to the example of FIG. 3) the uplink route Ru, i.e., the values of the identifiers of nodes separating the node, thus preparing to transmit the message MAA, from the head of the cluster to which it belongs, said route comprising the value of the identifier IDH of said head. Step 204 may further consist of encoding (fields MAA-5, MAA-6 according to the example of FIG. 3) additional information or values describing one or several capacities CHc1, CHc2 of the head to perform a given service. Step 204 may further encode the downlink route Rd separating the source node of the message MAA from the node requesting the affiliation (field MAA-4 according to the example of FIG. 3), or additional information (field MAA-8 according to the example of FIG. 3). The processing operation 200 then includes a step 205 for triggering the transmission of said message MAA via the communication means 13 of the device 10 carrying out said processing operation 200.

In the case where such a device, receiving an affiliation request message MAR, is a loose node (second situation symbolized by the link 203-$b$ in FIG. 3), the invention provides that advantageously, according to a first embodiment, such a device remains mute (step 207). According to a second embodiment, in particular when step 211 of a processing operation 210, according to the invention and previously described, consists of generating a message MAR encoding a field specifying a number of authorized hops or relays, the invention provides that the processing operation 200 makes it possible to relay an affiliation request message MAR via one or several nodes that do not act as members or heads of a cluster during receipt of said message MAR. According to this embodiment, the processing operation 200 includes a step 206 seeking to decrement, by a predefined pitch, for example one unit, the value TTL deduced or decoded in step 202. Step 206 further consists of comparing the decremented value of the field TTL to a floor value, as a non-limiting example, a zero value. If said decremented value reaches said floor value (situation symbolized by link 206-n in FIG. 3), the processing operation 200 is interrupted at 207 and the device carrying out said processing operation remains mute in response to the receipt of the message MAR. Otherwise (situation symbolized by the link 206-y in FIG. 3), the processing operation 200 includes a step 208 for once again encoding the information deduced in 202 from the received message MAR, with the exception of the field TTL, which is updated and assumes the value TTL decremented in step 206. Step 208 further consists of triggering the transmission of said re-encoded message MAR to the vicinity of the device, like a peer device that would carry out a processing operation 210 to generate and transmit an affiliation request message MAR on its own behalf. Thus, the relay device sends an affiliation request on behalf of another. Step 208 then furthermore advantageously consists of recording, in the storage means, the value of the identifier IDa of the node for which it is relaying the message MAR.

A device according to the invention can further also relay any message MAA acknowledging receipt of a message MAR, said message MAA having been generated and sent beforehand by a third-party device acting as head or member of a cluster in particular by implementing steps 204 and 205 of a processing operation 200 according to the invention. To that end, the invention provides that the processing operation 200 carried out by a message relay device MAA includes a step 209 for decoding a message MAA. This step in particular consists of determining the value of the identifier IDa of the device receiving the message MAA, i.e., the identifier of the device having transmitted the original message MAR. If said identifier value corresponds to that of the identifier saved in 208, then an iteration of step 205 seeking to trigger the transmission of a message acknowledging receipt of an affiliation request is carried out in order to propagate said message MAA. Thus, via one or several relay devices according to the invention and from one to the next, the message MAA transmitted from a member or head of a cluster can be conveyed to the device that is the source of the original affiliation request.

Carrying out an affiliation method P100, as previously described, a device, such as the device 10 described as a non-limiting example in connection with FIG. 2, can also become a node affiliated with a cluster. In connection with FIG. 3, to achieve this, such a device carries out a processing operation 210 in order to:
first of all, generate and send an affiliation request message MAR to a cluster, then
in response to said affiliation request, take into consideration a message MAA acknowledging receipt of said affiliation request, such a message MAA having been generated by a third-party device that is a member or head of a cluster, said third-party device also carrying out a method P100 according to the invention, more specifically a processing operation 200, and sent to the device requesting the affiliation, optionally via one or several loose and/or affiliated devices.

As previously mentioned in connection with FIGS. 1 and 2, the implementation of a single-hop network R2 or a multi-hop network R1 according to the invention is primarily intended to collect information related to the environment of the different nodes through sensors 15. Indeed, each communicating device 10 is advantageously affixed against the wall of a container. The processing unit 11 of each communicating device 10, acting according to the context as a member or, owing to the invention, acting as an affiliated node, is suitable for triggering the creation and transmission of service messages MS encoding environmental information of the device. The processing unit 11 of a device 10 acting as a head is suitable for receiving such service messages MS, deducing the environmental information therefrom coming from one or several members or affiliates, and carrying out a service, for example a long-range transmission of messages MC via a GPRS or equivalent network intended for a remote server RS.

Generating a service message MS via a member of a single-hop or multi-hop network from measurements delivered by one or several sensors is known in principle. However, the creation and transmission of a service message MS by an affiliated device, within the meaning of the invention, intended for a head, requires innovative creation and transmission processing 120 for such a message MS. FIG. 3 describes one example embodiment of such a processing operation 120.

The latter traditionally, i.e., like that implemented by a member node according to the prior art, includes a step 123a for generating a service message MS and a step for sending said message to the device acting as head for a determined service S. Such a step 123 is carried out after a prior step 121 in order, for example, to collect a measurement from a sensor 15 related to the temperature prevailing within a container against which the device 10 implementing the method P100 is affixed.

Such a step 123 is also subject to the presence (test symbolized by step 122 in FIG. 3) of a register, like the register RH recorded in the data memory 12 of the device 10 described in connection with FIG. 2, including the value of an identifier IDHc of a device or node acting as head (situation symbolized by the link 122-y in FIG. 3) indicating that the node is a member of or affiliated with a cluster. Otherwise (situation symbolized by the link 122-n in FIG. 3), the processing operation is interrupted at 129 and no transmission of such a message is triggered.

Depending on whether said register RH includes a direct uplink route Ru, i.e., only one head identifier value IDHc is present in the register RH, or an indirect uplink route Ru, i.e., said register RH further includes an identifier value ID' of a relaying member, the message MS is sent directly to said head or said relaying member.

Furthermore, such a transmission 123 of a service message MS can also be triggered by receiving 121b a service message MS coming from a member of a same cluster and sent to the device 10, which implements said affiliation method P100 and acts as relaying member. Following the receipt of such a service message from a member of a same cluster, step 121b can therefore include a step for receiving and decoding such a message MS, or for temporarily saving the data contained in said decoded service message MS in the memory 12. The relay of said message MS can thus be reflected by a retransmission of said message MS on a delay.

According to a first preferred embodiment, it may be relevant that prior to sending a service message, a communicating device acting as a node affiliated with a cluster validates the continuity of its affiliation. Indeed, the cluster with which said device is affiliated may have been destroyed, for example, at the initiative of the head or following a modification of the mutual configuration of the nodes.

The processing operation 120 thus includes a test step 124 seeking to determine whether the device is acting as a member node or affiliated node. This state can for example be determined by reading a Boolean state indicator, the current value of which is saved in the data memory 12 of the device or by any other technique. Such a state indicator can thus alternatively assume two predetermined values respectively describing that the node is "member or head" or "affiliated." Thus, step 215 of the processing operation 210 can further consist of updating said state indicator to specify that the device is, until proven otherwise, an affiliated node. If said state indicator attests that the node is a member of a cluster (situation illustrated by the link 124-n in FIG. 3), step 123 is carried out once a message MS is generated in 123a. Conversely, in the case where said state indicator attests that a node is affiliated (situation illustrated by the link 124-y in FIG. 3), the processing operation 120 includes a step 125 for generating a message MAS verifying the persistence of its affiliation and triggering the transmission of said message by the first communication means 13. The purpose of such a message MAS consists of verifying, in a subsequent step 126, that the member node having previously responded favorably to the affiliation request is still a member of the same cluster, i.e., attached to the same head node. As indicated as a non-limiting example in FIG. 3, a message MAS generated and sent in 125 advantageously includes two fields MAS-1 and MAS-2 to respectively encode the value of the identifier IDm of the device recipient of said message MAS and the value of the identifier IDa of the affiliated device. Such a message MAS could encode other additional information IMs in the form of an additional field MAS-3.

Like the processing operation 210, which includes a step 213 for waiting to receive a message acknowledging receipt of an affiliation request, the processing operation 120 includes a step 126 for waiting to receive a message MMA, acknowledging receipt of the message MAS, generated and sent by the node receiving the message MAS.

Indeed, the processing operation 200 carried out by a device having previously responded favorably to an affiliation request may advantageously include a step 202a for decoding an affiliation verification message MAS received previously in 201a by the first communication means. Step 202a can consist of decoding said verification message MAS to deduce the value therefrom of the identifier IDa of the source device of the message MAS as well as the identifier value of the device receiving said message. When the latter corresponds to the value of the identifier dedicated to said device carrying out the processing operation 200, the latter considers that the message MAS is intended for it.

If, in 203, the device detects that it is a member of a cluster (situation illustrated by the link 203-a in FIG. 3), the device carries out steps 204, then 205 in order to generate, then transmit, via the first communication messages 13, a message MAA acknowledging receipt of the message MAS, like a message MAA generated, then transmitted in response to the receipt of an affiliation request message MAR to which the device responds favorably. Otherwise (situation illustrated by the link 203-b in FIG. 3), the device remains mute in 207. The processing operation 200 is interrupted.

For the affiliated device, a maximum waiting duration in step 126 for such a message MAA can be configured or determined such that at the end of a given length of time, the affiliated device considers (situation symbolized by the link referenced 126-n in FIG. 3) that it is no longer affiliated with the cluster. The processing operation 120 is thus interrupted in step 129. The device once again becomes a loose node. Such a step 129 can in particular consist of erasing the register RH. It may further consist of placing the device in sleep or standby mode during a predetermined period of time using a WOR technique, for example.

The invention provides, alternatively or additionally, that a loss of affiliation message MAAR can be generated, then transmitted by a communicating electronic device in place of a "silence" or a non-transmission of a message MAA, in reaction to the receipt of an affiliation verification message MAS when the recipient of said message MAS is no longer a member of a cluster. To that end, in step 207, such a device may generate a loss of affiliation message MAAR and trigger the transmission thereof by the first communication means.

Such a message MAAR creation may consist of encoding:
  the value of the identifier IDa as identifier value of the device recipient of the message MAAR;
  the value of the identifier IDm of the device as identifier value of the source device of said message MAAR.

Such a message may include, like other messages MAR, MAA, MAS or MS, additional information typifying said message.

According to this alternative, when, during step 126, a message MAAR is received, then decoded, attesting that the value of the identifier of the recipient device is equal to that of the identifier IDa of the source device of the message MAS and the value of the source identifier of said message MAAR corresponds to that of the identifier of the recipient device of the message MAS, the processing operation 120 ends in 129, as previously described. The previously affiliated device once again becomes a loose node.

When, during step 126, a message MAA acknowledging receipt of the message MAS is received by the first communication means 13, said message MAA is decoded to deduce the content of the fields MAA-1, MAA-2 and MAA-3 in particular therefrom, and thus to determine the value of the identifier IDm of the source device of the message MAA, the value of the identifier IDa of the affiliated node and that of the identifier IDHc of the head node of the cluster. Step 126 thus makes it possible to verify (situation symbolized by the link referenced 126-y in FIG. 3) that the affiliated node is indeed the recipient of the message MAA, that the latter was indeed sent by the member node having responded favorably to the affiliation request, and that the cluster is still attached to the same head. Step 126 can further deduce, from the message MAA, the value of a capacity, for example encoded in the field MAA-5 or MAA-6, of the head to perform a particular service. Thus, the invention provides an embodiment for which the affiliated node can confirm or invalidate that said capacity is sufficient in light of pre-established criteria. Step 126 can further consist of updating the register RH in the data memory 12 to update the current value CHc of said capacity. If not, step 129 is carried out and the affiliated node ends its affiliation itself. If the message MAA indeed meets the expectations of the affiliated node, thus confirming the continuity of the affiliation, step 123 triggering the transmission of the service message MS is carried out.

We have seen previously, in connection with the processing operation 210, that the invention provides that the transmission power of an affiliation request message MAR can be gradual. Advantageously, the same is true for the transmission of a message MAS. The objective sought by this embodiment is thus to preserve the energy resources of the means 17 of the affiliated device. To implement such a progressive approach, the transmission power of a message MAS can first be configured by the processing unit to send said message MAS over a short range. A first iteration of step 125 thus consists of configuring the transmission power at a floor value P'min. At the end of the maximum waiting time set out in step 126, if no message MAS has been received (situation symbolized by the link referenced 126-*n* in FIG. 3), step 129 is not automatically carried out as for the previous embodiment. Instead, the processing operation 120 consists of triggering a new iteration of the step 125 and thus once again sending the message MAS with an increased transmission power P'min+. This increase is done by the processing unit carrying out the processing operation 120 in a step 127, for example according to a given multiplying factor or a determined incremental pitch applied to the floor power P'min. If, at the end of the maximum duration set out in step 126, no message MAA has been received (situation symbolized by the link referenced 126-*n* in FIG. 3), the processing operation 120 can trigger a new iteration of step 125. One or several iterations of steps 127 and 125 can thus follow one another as long as no message MAS is received and as long as the power P'min+ remains below a maximum transmission power P'max of a message MAS (situation symbolized by the link referenced 128-*n* in FIG. 3). Said iterations cease once, at 128, the maximum transmission power of a message MAS is reached (situation symbolized by the link referenced 128-*y* in FIG. 3). In this case, the processing operation 120 is interrupted at 129.

The invention provides that furthermore, the maximum waiting duration set out in step 126 can also be progressive and revised upon each iteration of step 127.

Furthermore, in order to preserve the energy resources, such as the means 17 described in connection with FIG. 2, of the nodes of a network according to the invention, the invention in particular provides that the relays or initial transmissions of messages, in particular affiliation request messages MAR, affiliation verification messages MAS, acknowledgment of receipt messages MAA for earlier messages, or service messages MS, can be made subject within a communicating electronic device acting as member, affiliated or loose node of said network with one or several minimum thresholds (for example, depending on the type of message, or depending on whether said message is relayed or transmitted for the first time) in connection with the remaining electricity capacity of the means 17 of said communicating electronic device. Thus, in connection with FIG. 3, the invention provides that the steps for transmitting a message, i.e., non-limitingly, steps 212, 125, 123, 205 or 208 each or in part include a prior step consisting of testing the remaining energy capacity relative to the relevant minimum threshold. If said remaining capacity is above said threshold, the transmission of the message is triggered. Otherwise, the device carrying out an affiliation method according to the invention remains silent. Such an alternative embodiment for example makes it possible to favor the transmission of service messages MS with respect to administration messages MAR, MAS, MAA of the network.

According to a second preferred embodiment, the invention provides that a member can, prior to sending a service message MS or more generally a relayed message, like an affiliated node, generate a verification message MAS, no longer for the persistence of its affiliation, but the persistence of its membership in the cluster, intended for the cluster head. Such a message MAS includes a first field MAS-1 encoding the identifier of the head and a field MAS-2 encoding the identifier of the source member node of said message MAS. The head can, like a member node having responded favorably to a membership request, send a message MAA acknowledging receipt of the verification message MAS and attesting to the maintenance of its role as head. Such a message MAA can further include fields MAA-6, MAA-7, for example to update the current capacity values CHc1, CHc2 of said head to perform a given service. It includes a field MAA-1 encoding the identifier of the source head of said message and a field MAA-2 encoding the identifier of the recipient node of the message. According to this second preferred embodiment, the step 124 seeking to separate a member node from an affiliated node may no longer be carried out. Indeed, any member or affiliated node verifies the persistence of the membership in a cluster before transmitting a message in particular intended for the head of said cluster, by sending a membership verification message to the cluster MAS, and receiving a message MAA acknowledging receipt of said membership verification message in the cluster and attesting to the membership in the cluster transmitted in response to the receipt of the message MAS by the recipient of said message.

Like an affiliated node, any member or affiliated node can receive a loss of membership message in the cluster like a loss of affiliation message MAAR, generated, then transmitted by a communicating electronic device, in place of a "silence" or non-transmission of a message MAA, in response to the receipt of a membership verification message MAS in the cluster when the recipient of said message MAS no longer belongs to the cluster.

The invention alternatively or additionally sets out that once a member node has responded favorably to an affiliation request, the affiliated node can advantageously behave similarly or comparably to a member node having joined the cluster following an enrollment message MH. The affiliated node can thus receive affiliation request messages MAR and advantageously respond to an affiliation request by generating and sending a message MAA, acknowledging receipt of said affiliation request message MAR.

Alternatively, the invention provides that an affiliated node cannot directly give a favorable response to an affiliation request, but acts as a relay for said request such that a member of a cluster can optionally access the affiliation request. The affiliated node can likewise relay the response from a member of a cluster to the affiliation request to the source node of the affiliation request.

Irrespective of the configuration of a method P100 for joining a cluster, said method being according to the invention, one preferred adaptation mode for a communicating electronic device, like that described in connection with FIG. 2, consists of saving or downloading a computer program P into program memory 14, including a plurality of program instructions, which, when executed or interpreted by the processing unit of said device, causes said method P100 to be carried out.

The invention has been described through one preferred example application related to the monitoring of containers of goods, solid, fluid or liquid merchandise, said containers respectively cooperating with communicating electronic devices, such as the device 10 according to FIG. 2, carrying out an affiliation method, like the method P100 illustrated in FIG. 3, said devices each including a sensor cooperating with a processing unit to measure and collect a property related to the internal and/or external environments of said containers.

Such devices could be used for any other application different from that seeking to transmit collected data over a long-distance link. They could also, alternatively or additionally, perform one or several other services. To that end, as previously mentioned, the data memory 12 of each device can include not a single register RH dedicated to a specific service S, but a plurality of registers RHn, forming a table, each register being dedicated to a particular service Sn. According to this alternative, the affiliation request messages MAR or service messages MS would include information making it possible to identify the service Sn determined and affected by each of said messages. To that end, steps 211, 123a of an affiliation method P100 according to the invention would in particular be adapted to encode said information making it possible to identify the service Sn.

Furthermore, the invention provides that a communicating device can, upon receiving an affiliation request through a message MAR, be affiliated with a plurality of clusters for a same service. Thus, a plurality of registers RHm forms a table, each register being dedicated to a particular head. According to this alternative, a device thus having multiple affiliations can choose to transmit a service message MS to one of said heads. Such a choice can be made based on the respective capacities of the heads to perform the service, or even, non-limitingly, on the respective distances of said heads in number of hops. To implement such a multiple affiliation, step 123a for generating a service message can advantageously encode the value of the identifier of the head with the best capacity or that is closest to the device as the identifier value of the recipient of said service message. The respective values of the capacities of said heads could in fact be updated, for example, over the course of the messages MAA received and decoded in step 126 of the processing operation 120, as described in connection with FIG. 3. The affiliated device can thus arbitrate between the clusters with which it is affiliated according to different criteria, such as, by way of non-limiting examples, the capacity of the head, the distance in number of hops of said head, etc.

Furthermore, the invention thus relates to any system including a plurality of communicating electronic devices according to the invention. More specifically, the invention relates to any traceability system for containers located in a storage area or a transport platform, said system further including a remote entity for collecting and exploiting messages MC transmitted from one or several of said devices when they act as cluster head. Such a system has performance levels, in terms of energy autonomy, robustness and adaptability to operating conditions, that are unparalleled and incomparable with respect to those provided by the known solutions, such as, for example, the LEACH method. Indeed, owing to the invention, the exploitation of cluster heads, from their elections to the performance of the actions affected by a determined service, is optimal, avoiding any superfluous or inefficient communication within the network or intended for third-party entities.

The invention claimed is:

1. A method implemented by a processing unit of a first communicating electronic device further including a data memory, first communication means providing nearby wireless communication with any other communicating electronic device situated within communication range within a cluster comprising a plurality of communicating electronic devices, said memory and said communication means cooperating with said processing unit, the data memory storing a value of an identifier dedicated to the first communicating electronic device and a register arranged to include the current value of an identifier of a communicating electronic device acting as a cluster head, said method including a step for sending a service message to the device acting as cluster head, and further comprising:
   a step prior to the sending of the service message for generating and sending, via the first communication means, a verification message (MAS) for belonging to the cluster, said verification message encoding:
      i. the value (MAS-1) of the identifier of a second communicating electronic device as identifier of the communicating electronic device recipient of said verification message (MAS) for belonging to the cluster; and
      ii. the value (MAS-2) of the identifier of the first device as identifier of the communicating electronic device that is the source of said verification message (MAS) for belonging to said cluster; and
   a step of sending the service message in response to receiving an acknowledgment of the verification message.

2. The method according to claim 1, wherein the step prior to sending the service message for generating and sending, via the first communication means, a message (MAS) verifying belonging to the cluster is only carried out if a test step shows that the device is affiliated with the cluster.

3. The method according to claim 2, including:
   a step, carried out if and only if a message (MAA) acknowledging receipt of said message verifying belonging to the cluster is received before the expiration of a maximum waiting time determined from the sending of the message (MAS) verifying belonging to the cluster, to decode said message (MAA) acknowledging receipt and deduce therefrom:
      i. the value (MAA-2) of the identifier of the device recipient of said message (MAA) acknowledging receipt of the message (MAS) verifying belonging to the cluster;
      ii. the value (MAA-1) of the identifier of the source device of said message (MAA) acknowledging receipt of the message (MAS) verifying belonging to the cluster;
   wherein the steps for generating and initiating the sending of a service message are only being carried out if:
      the deduced value (MAA-2) of the identifier of the device receiving the message (MAA)-acknowledging receipt of the message (MAS)-verifying belonging to the cluster is equal to that of the identifier of the first communicating electronic device;
      the deduced value (MAA-1) of the identifier of the source device of said message (MAA)-acknowledging receipt of the message (MAS)-verifying belonging to the cluster is equal to that of the identifier of the second communicating electronic device.

4. The method according to claim 1, including:
   a step for receiving a message requesting affiliation generated and sent by a third communicating electronic device requesting an affiliation with a cluster, said affiliation request message including the value of the identifier of said third device requesting an affiliation;
   a step for decoding said affiliation request message and deducing the value therefrom of said identifier of said third device requesting affiliation;
   a step for generating a message (MAA) acknowledging receipt of the affiliation request comprising encoding, within said message (MAA):
      i. the value of the identifier of the first device as identifier of the source device of said message (MAA)-acknowledging receipt of the affiliation request, ii. the value of the identifier of the third device requesting affiliation as identifier of the device recipient of said message (MAA) acknowledging receipt of the affiliation request, iii. the current value of the identifier of a fourth communicating electronic device acting as a cluster head, said value being read in the register, a step for triggering the sending, by the first communication means, of the message (MAA)-acknowledging receipt of the affiliation request.

5. The method according to claim 4, wherein the step for generating a message (MAA)-acknowledging receipt of the affiliation request further comprises encoding a value describing a capacity of the fourth communicating electronic device acting as cluster head to perform a service, said value being recorded in the register further storing the current value of the identifier of said fourth communicating electronic device acting as cluster head.

6. The method according to claim 1, wherein the step for triggering the transmission, by the first communication means, of the message (MAA)-acknowledging receipt of the affiliation request is only performed if the data memory stores a register including a current value of an identifier of a communicating electronic device acting as cluster head.

7. The method according to claim 1, including:

a step for generating an affiliation request message comprising encoding (MAR-1) the value of the identifier of the first device as identifier of a device requesting affiliation with a cluster;

a step for initiating the sending, by the first communication means, of said affiliation request message;

a step for receiving, by the communication means, a message (MAA) generated and sent by a fifth device acknowledging receipt of the affiliation request message;

a step, carried out only if said message-(MAA), acknowledging receipt of the affiliation request message, is received before the expiration of a maximum waiting time determined from the sending of said affiliation request message, to decode said message (MAA)-acknowledging receipt of the affiliation request message and to deduce therefrom:

i. the value of the identifier (MAA-2) of the device recipient of said message (MAA)-acknowledging receipt of an affiliation request;

ii. the value of the identifier (MAA-3) of a sixth communicating electronic device acting as cluster head to which the fifth source device of said message (MAA)-acknowledging receipt of an affiliation request belongs;

a step, carried out only if said deduced value (MAA-2) of the identifier of the receiving device is equal to that of the value of the identifier of the first device requesting affiliation, to record, in the register, the deduced value of the identifier of the sixth communicating electronic device acting as cluster head, as current value of the identifier of the device acting as cluster head.

8. The method according to claim 7, wherein:

the step for decoding the message (MAA) acknowledging receipt of the affiliation request message further comprises deducing (MAA-1), from said message (MAA), the value of the identifier of the fifth communicating electronic device that is the source of said message (MAA);

the step for updating the register further comprises recording said deduced identifier value therein as identifier of the communicating electronic device and an uplink route separating the first communicating electronic device requesting affiliation from the sixth communicating electronic device acting as cluster head.

9. The method according to claim 1, including a step prior to the step for sending a service message intended for the device acting as cluster head to generate and initiate, via the first communication means, the sending of the service message intended for the communicating electronic device whose identifier value is stored, as current identifier value of the communicating electronic device acting as cluster head, by the register.

10. A non-transitory computer-readable medium storing a computer program including a plurality of program instructions, which, when they are:

stored in a program memory of such an electronic device further including a processing unit, first communication means ensuring wireless nearby communication with any other electronic device situated within the communication range, a data memory saving the value of an identifier dedicated to the device and a register to include the current value of an identifier of a device acting as cluster head, said memories and said first communication means cooperating with said processing unit; and executed or interpreted by said processing means, causes the implementation of an affiliation method according to claim 1.

11. An electronic device including a processing unit, a data memory, a program memory, first communication means providing wireless nearby communication with any other electronic device situated within communication range, said memories and said first communication means cooperating with said processing unit, the data memory including the value of an identifier dedicated to the device and a register to include the current value of an identifier of a device acting as cluster head, said device including, in the program memory, the instructions of a program according to claim 10.

12. A system including a plurality of communicating electronic devices according to claim 11.

13. The system according to claim 12, including a plurality of containers of goods, solid, fluid or liquid merchandise, said containers respectively cooperating with the communicating electronic devices, each communicating electronic device including a sensor cooperating with the processing unit to measure and collect a property related to the internal and/or external environment of said containers.

* * * * *